US011953029B2

(12) United States Patent
Chuan

(10) Patent No.: US 11,953,029 B2
(45) Date of Patent: Apr. 9, 2024

(54) AUTOMATIC OIL RETURN STRUCTURE FOR PISTON PUMP

(71) Applicant: KUDOS MECHANICAL CO., LTD., New Taipei (TW)

(72) Inventor: James Chuan, New Taipei (TW)

(73) Assignee: Kudos Mechanical Co., Ltd., New Taipei (TW)

(*) Notice: Subject to any disclaimer, the term of this patent is extended or adjusted under 35 U.S.C. 154(b) by 0 days.

(21) Appl. No.: 18/054,410

(22) Filed: Nov. 10, 2022

(65) Prior Publication Data

US 2024/0068491 A1 Feb. 29, 2024

(30) Foreign Application Priority Data

Aug. 23, 2022 (TW) ................................ 111131734

(51) Int. Cl.

| | |
|---|---|
| ***B25F 5/00*** | (2006.01) |
| ***F15B 11/15*** | (2006.01) |
| ***F15B 13/02*** | (2006.01) |
| ***F15B 15/14*** | (2006.01) |

(52) U.S. Cl.

CPC ............ *F15B 11/15* (2013.01); *F15B 13/021* (2013.01); *F15B 15/1476* (2013.01); *F15B 15/149* (2013.01); *B25F 5/005* (2013.01); *F15B 2211/423* (2013.01); *F15B 2211/428* (2013.01); *F15B 2211/505* (2013.01)

(58) Field of Classification Search

None

See application file for complete search history.

(56) References Cited

U.S. PATENT DOCUMENTS

| | | | | |
|---|---|---|---|---|
| 2,688,231 A * | 9/1954 | Northcutt | ........... | H01R 43/0427 92/130 C |
| 5,195,042 A * | 3/1993 | Ferraro | ............. | H01R 43/0427 72/19.9 |
| 6,769,356 B2 * | 8/2004 | Frenken | .................. | B21J 15/20 100/269.16 |
| 10,962,034 B1 * | 3/2021 | Chuan | ..................... | B25B 27/10 |

* cited by examiner

*Primary Examiner* — Kenneth Bomberg
*Assistant Examiner* — Michael Quandt
(74) *Attorney, Agent, or Firm* — Rosenberg, Klein & Lee

(57) ABSTRACT

An automatic oil return structure has a main body assembly mounted between an oil storage container and a housing, and having a pressure regulating blocking unit, a pressure regulating elastic unit, an engaging unit, and an engaging elastic unit. The pressure regulating elastic unit pushes the pressure regulating blocking unit to block a first pressure regulating channel. An engaging groove is formed radially inward on the pressure regulating blocking unit. The engaging elastic unit pushes the engaging unit toward the pressure regulating blocking unit. When a pressure in the first pressure regulating channel is higher than a set value and the pressure regulating blocking unit is pushed away to a set distance, the engaging unit is pushed to engage with the engaging groove of the pressure regulating blocking unit such that the pressure regulating blocking unit is unmovable to avoid blocking the first pressure regulating channel.

14 Claims, 18 Drawing Sheets

AUTOMATIC OIL RETURN STRUCTURE FOR PISTON PUMP

BACKGROUND OF THE INVENTION

1. Field of the Invention

The present invention relates to a piston pump, especially to a piston pump that is adapted for handheld tools such as a clamping tool.

2. Description of the Prior Arts

A conventional piston pump has an oil storage container, a driving assembly, and a housing. The driving assembly drains oil from the oil storage container and then pressurizes the oil to push and move the housing.

Once the housing pushes against an object to be squeezed during its movement, pressure of the oil increases along with the squeezing movement. When the pressure of the oil reaches the set value, which indicates that the housing has been squeezed to a required extent, a safety valve is pushed and opened by the pressurized oil, and then the oil will flow through the safety channel and return to the oil storage container.

However, at the time the safety valve is open, the pressure of the oil will instantaneously drop to zero, so the safety valve is only opened for a moment and will instantly close again as the pressure returns to zero, and therefore only a very small amount of oil actually passes through the safety valve and returns to the oil storage container from the safety channel. At this time, it is necessary to further press the oil reflow lever to open the oil return channel. However, a user must keep pressing the oil reflow lever until all the oil flows back from the oil return channel into the oil storage container, which is inconvenient to do so.

Therefore, a better improvement scheme is an urgent issue in this industry.

To overcome the shortcomings, the present invention provides an automatic oil return structure to mitigate or obviate the aforementioned problems.

SUMMARY OF THE INVENTION

The main objective of the present invention is to provide an automatic oil return structure that automatically returns all the oil back to the oil storage container when the pressure of the oil reaches a set value.

The automatic oil return structure has an oil storage container, a housing, and a main body assembly. The housing is spaced apart from the oil storage container and has an oil storage chamber. The main body assembly is mounted between the oil storage container and the housing and has a first main channel, a second main channel, a first main channel, a second main channel, an automatic oil reflow channel, a piston oil channel, a connecting channel, a main controlling channel, a main controlling unit, a first pressure regulating channel, a first controlling channel, a second pressure regulating channel, a second controlling channel, a pressure regulating controlling unit, an engagement controlling unit, and a disengaging channel. The first main channel is connected to the oil storage container. The second main channel is connected to the oil storage container and the oil storage chamber of the housing. The first main channel blocking unit is mounted in the first main channel and selectively blocks the first main channel. The second main channel blocking unit is mounted in the second main channel and selectively blocks the second main channel. The automatic oil reflow channel is connected to the oil storage container. The piston oil channel is connected to the oil storage chamber of the housing. The connecting channel is connected to the first main channel. The main controlling channel is connected to the automatic oil reflow channel, the connecting channel and the piston oil channel. The main controlling unit is mounted in the main controlling channel and has a main blocking unit and a main elastic unit. The main elastic unit pushes the main blocking unit to block the connecting channel and to connect the piston oil channel and the automatic oil reflow channel. When a pressure in the connecting channel is higher than a set value, the main blocking unit will be pushed away and be pushed to block the automatic oil reflow channel and to connect the piston oil channel and the connecting channel. The first pressure regulating channel is connected to the connecting channel. The first controlling channel is connected to the first pressure regulating channel. The second pressure regulating channel is connected to the first controlling channel and the oil storage container. The second controlling channel is connected to the first controlling channel. The pressure regulating controlling unit is mounted in the first controlling channel and has a pressure regulating blocking unit and a pressure regulating elastic unit. The pressure regulating elastic unit pushes the pressure regulating blocking unit to block the first pressure regulating channel. When a pressure in the first pressure regulating channel is higher than a set value, the pressure regulating blocking unit will be pushed away to connect the first pressure regulating channel and the first controlling channel. The engaging groove is formed radially inward on the pressure regulating blocking unit. The engagement controlling unit is mounted in the second controlling channel and has an engaging unit and an engaging elastic unit. The engaging unit divides the second controlling channel into a disengaging segment and a resetting segment which are unconnected with each other. The disengaging segment is connected to the first controlling channel. The engaging elastic unit pushes the engaging unit toward the pressure regulating blocking unit. When a pressure in the first pressure regulating channel is higher than a set value and the pressure regulating blocking unit is pushed away to a set distance, the engaging unit is pushed to engage with the engaging groove of the pressure regulating blocking unit such that the pressure regulating blocking unit is unmovable to avoid blocking the first pressure regulating channel. The disengaging channel connected is to the disengaging segment of the second controlling channel and the first main channel.

The advantages of the present invention are as follows. When the piston pump is operated normally, oil in the oil storage container flows into the housing through the second main channel, and at the same time the oil also flows into the housing sequentially through the first main channel, the connecting channel, the main controlling channel (pushing away the main blocking unit), and the piston oil channel, so as to push the housing to move.

Besides, at this time, the oil in the housing also flows into the first pressure regulating channel sequentially through the piston oil channel, the main controlling channel, and the connecting channel. But the oil in the housing will not move from the first pressure regulating channel to the first controlling channel because the pressure of the oil in the housing at an early stage is insufficient to push away and open the pressure regulating blocking unit.

However, when the pressure of the oil reaches a set value, the pressure will be transmitted to a first pressure regulating channel to push away the pressure regulating blocking unit, and the engaging unit that originally abuts the outer wall of the pressure regulating blocking unit will be pushed and engaged to the pressure regulating blocking unit, thereby keeping the pressure regulating blocking unit in the pushed position. When the pressure regulating blocking unit remains pushed away, the first pressure regulating channel is connected to the oil storage container through the second pressure regulating channel, such that the pressure of the oil is released and the oil cannot continue to push the main blocking unit inside the main controlling channel, so the main blocking unit is changed to block the connecting channel and the piston oil channel is changed to be connected to the automatic oil reflow channel, and thus the oil in the housing can be returned to the oil storage container through the piston oil channel, the main controlling channel, and the automatic oil reflow channel.

When the piston pump is reused next time, during the movement that the oil in the oil storage container passes through the first main channel to the housing, the oil in the oil storage container will also pass through the disengaging channel to the disengaging segment of the second controlling channel and push the engaging unit away. Therefore, the pressure regulating blocking unit will be pushed by the pressure regulating elastic unit to immediately reset to block the first pressure regulating channel, and the oil in the oil storage container will push the main blocking unit away again to change the main blocking unit to block the automatic oil reflow channel after reaching the main controlling channel sequentially through the first main channel and the connecting channel, thereby avoiding oil reflow.

The present invention improves the structure of the conventional safety valve, keeps the safety valve pushed away after the pressure reaches a set value, and take this as a switch to move the main blocking unit in the main controlling channel to open the oil reflow passage, so as to realize the automatic oil returning function, thereby facilitating operation.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
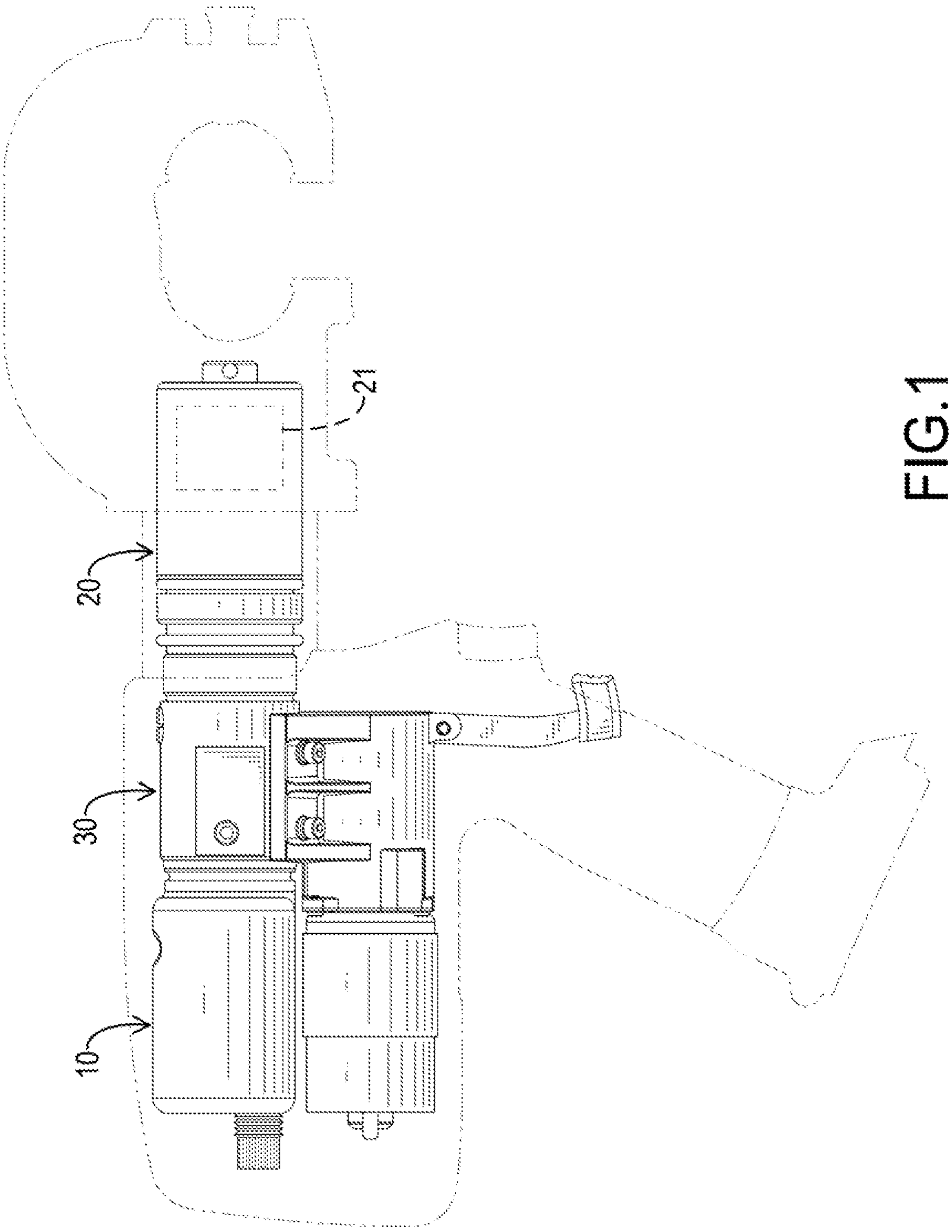
FIG. 1 is a side view of an automatic oil return structure in accordance with the present invention.
Figure 2:
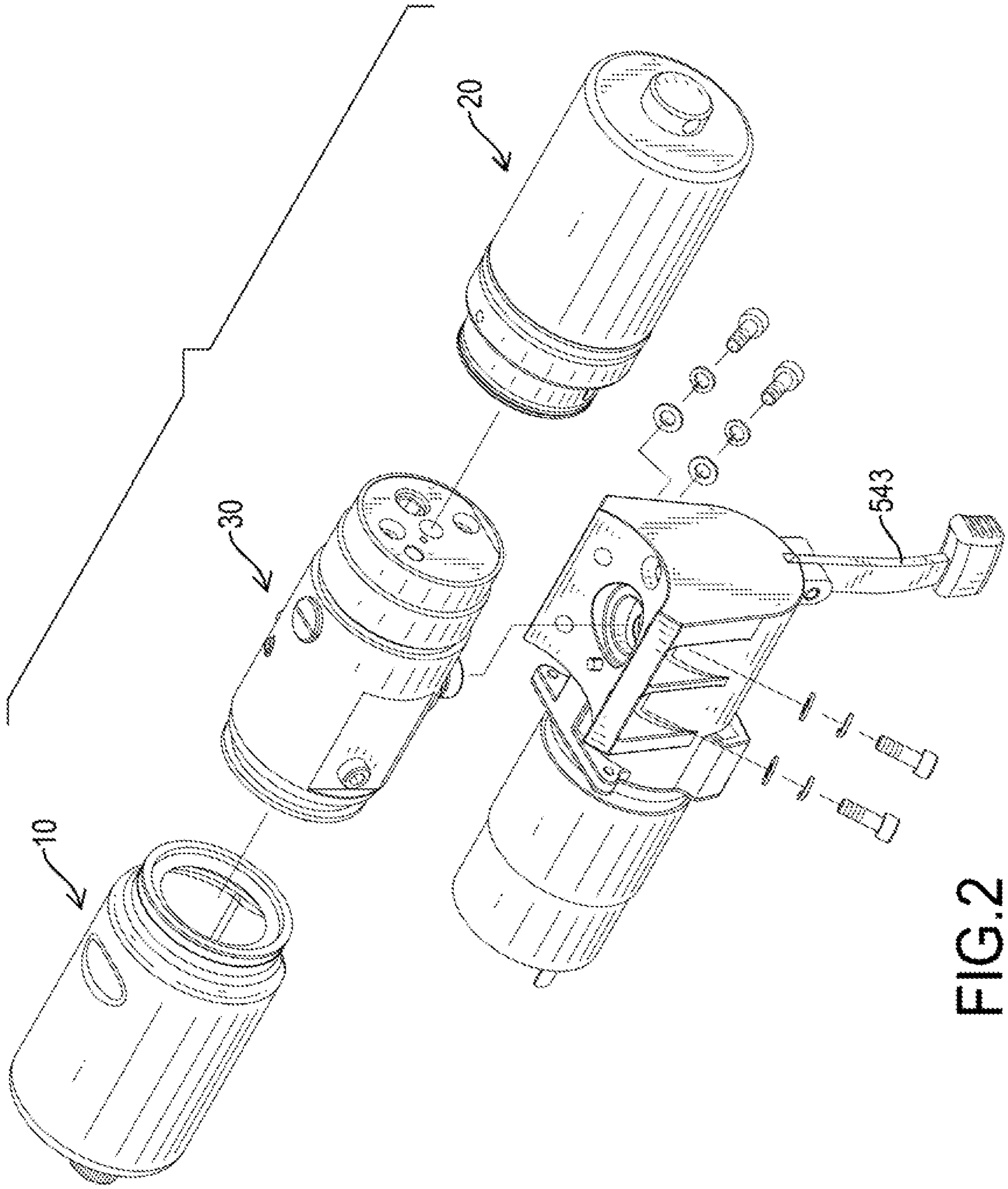
FIG. 2 is an exploded view of the automatic oil return structure in FIG. 1.

With reference to FIGS. 1 and 2, an automatic oil return structure for a piston pump in accordance with the present invention comprises an oil storage container 10, a housing 20 and a main body assembly 30. The housing 20 and the oil storage container 10 are spaced apart from each other. The housing 20 has an oil storage chamber 21. The main body assembly 30 is mounted between the oil storage container 10 and the housing 20.

With reference to FIGS. 4 to 10, the main body assembly 30 has a first main channel 41, a second main channel 42, a first main channel blocking unit 43, a second main channel blocking unit 44, an automatic oil reflow channel 51, a manual controlling channel 52, a manual oil reflow channel 53, a manual oil reflow blocking unit 54, a main controlling channel 61, a piston oil channel 62, a connecting channel 63, a main controlling unit 64, a first pressure regulating channel 71, a first controlling channel 72, a second pressure regulating channel 73, a second controlling channel 74, a pressure regulating controlling unit 75, an engagement controlling unit 76 and a disengaging channel 77.

Figure 6:
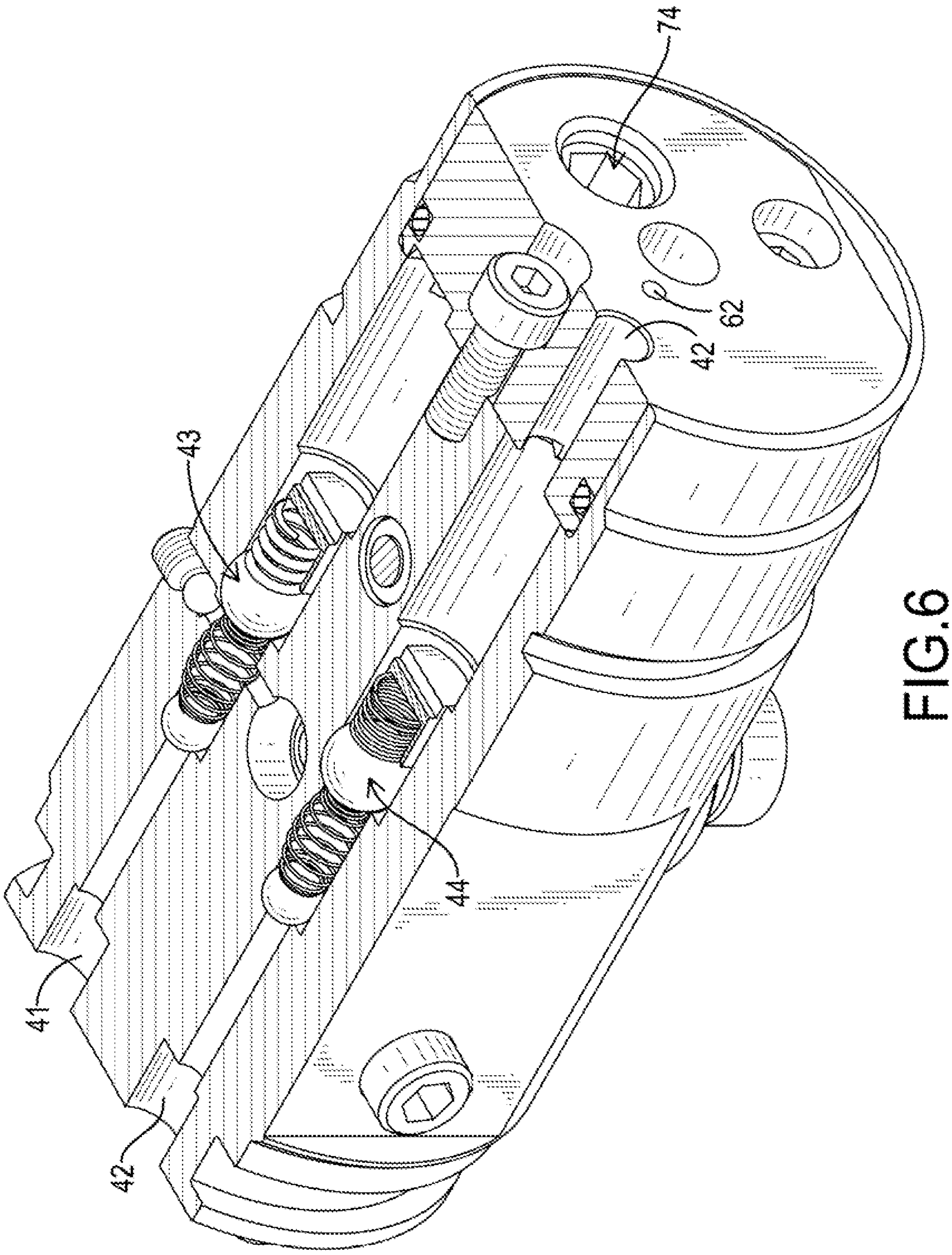
FIGS. 6 to 8 are top views in cross-section of the automatic oil return structure in FIG. 1, showing the main body assembly.
Figure 7:
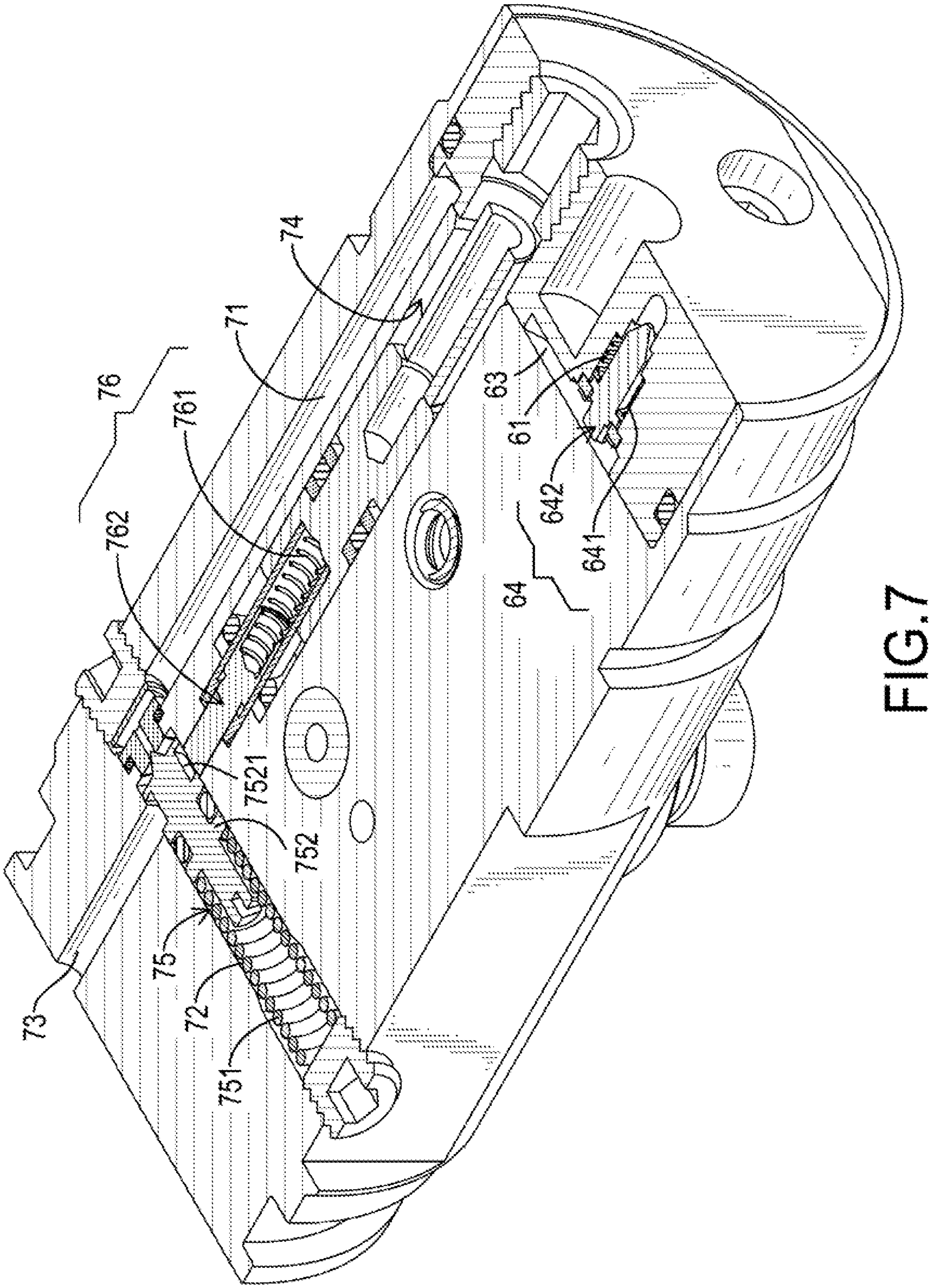
Figure 9:
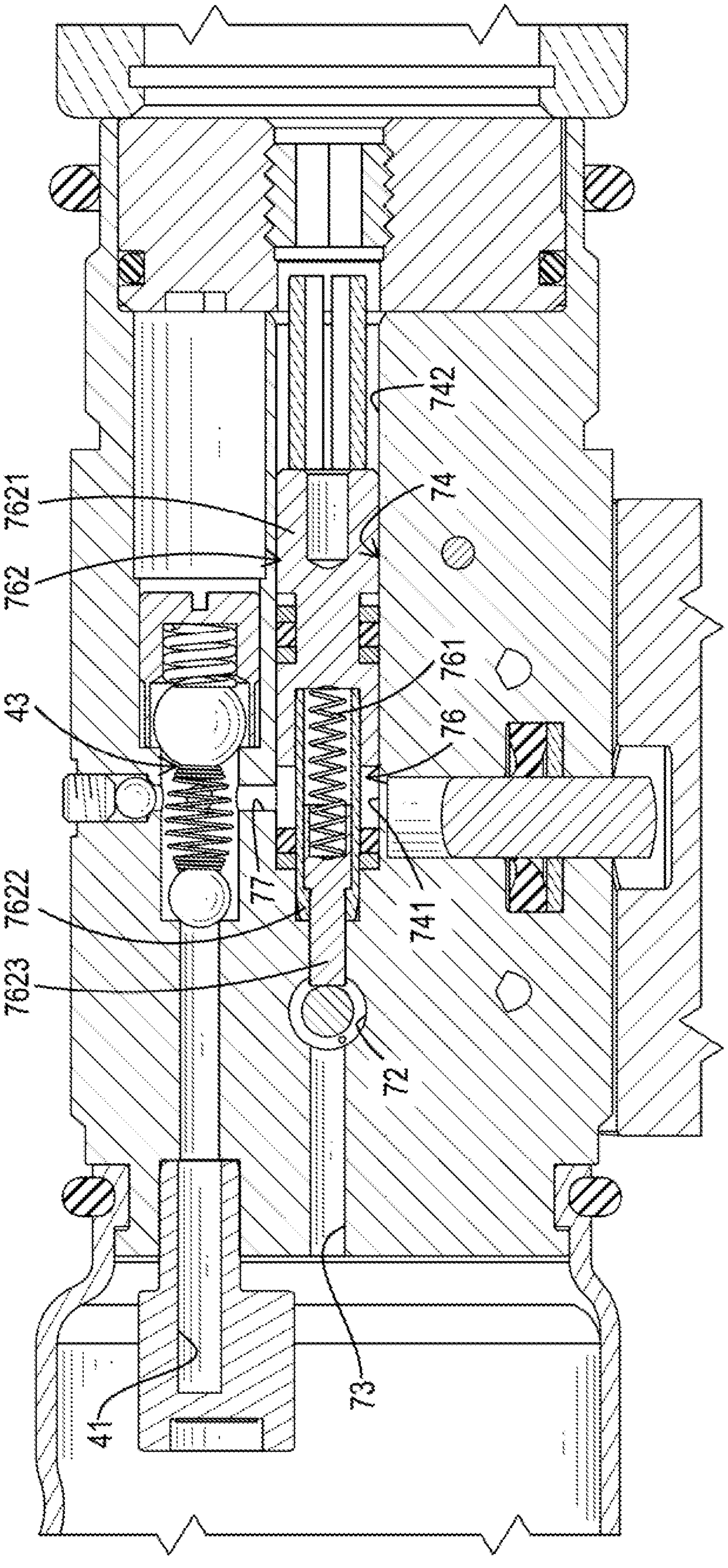
FIGS. 9 to 11 are side views in cross-section of the automatic oil return structure in FIG. 1, showing the main body assembly.
Figure 11:
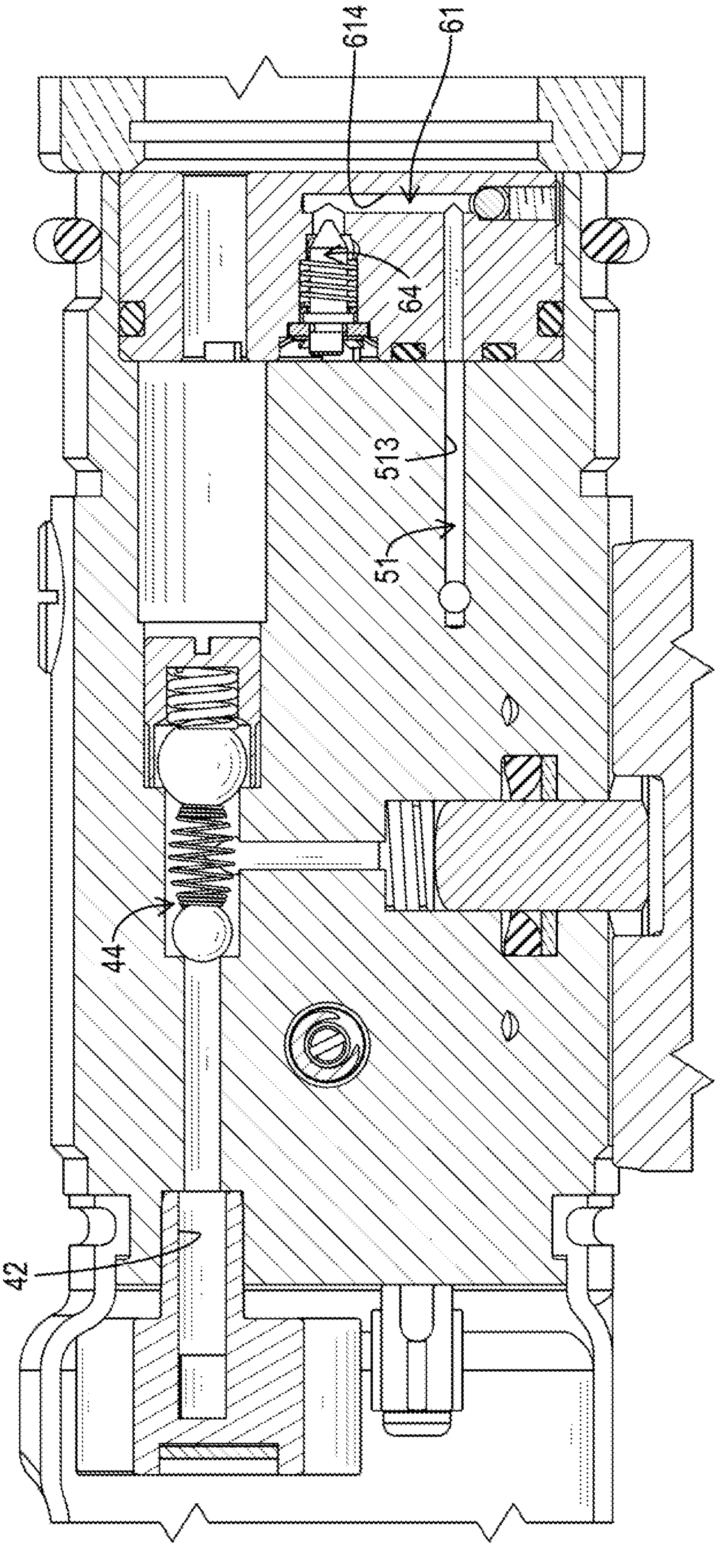

With reference to FIGS. 6, 9 and 11, the first main channel 41 is connected to the oil storage container 10, and is connected to the oil storage chamber 21 of the housing 20 via several passages (as detailed later). The second main channel 42 is connected to the oil storage container 10 and the oil storage chamber 21 of the housing 20. The first main channel blocking unit 43 is mounted in the first main channel 41 and selectively blocks the first main channel 41. The second main channel blocking unit 44 is mounted in the second main channel 42 and selectively blocks the second main channel 42. The first main channel 41, the second main channel 42, the first main channel blocking unit 43, and the second main channel blocking unit 44 are conventional, and thus their structure will not be detailed here. In this embodiment, the first main channel 41 is a high-pressure channel and the second main channel 42 is a low-pressure channel. In other words, when the oil pressure in the housing 20 increases, oil in the oil storage container 10 will not flow to the housing 20 via the second main channel 42, but will flow to the housing 20 via the first main channel 41. But in another embodiment, the first main channel 41 and the second main channel 42 are not limited to respectively a high-pressure channel and a low-pressure channel.

Figure 3:
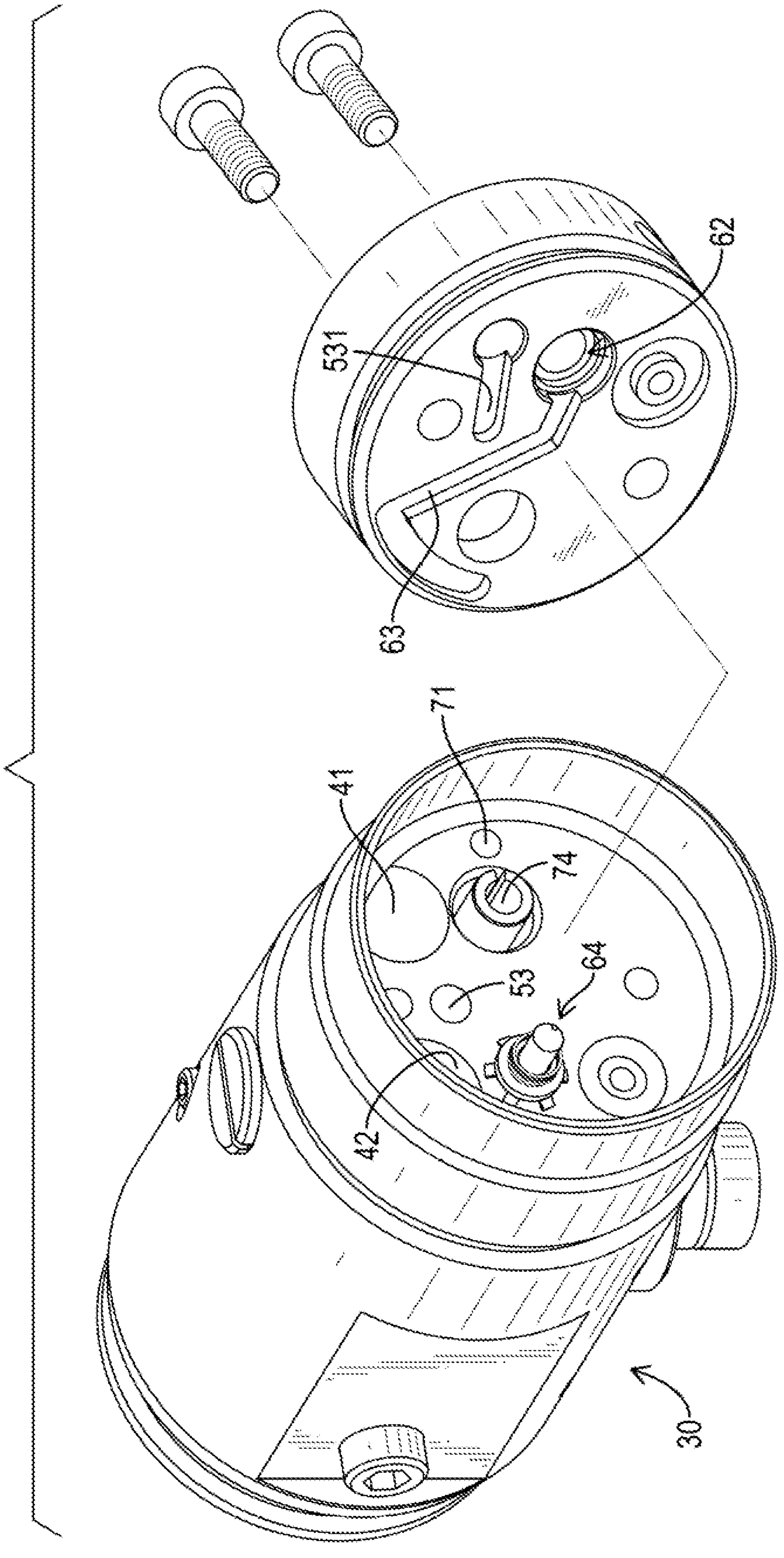
FIG. 3 is another exploded view of the automatic oil return structure in FIG. 1, showing the main body assembly.
Figure 4:
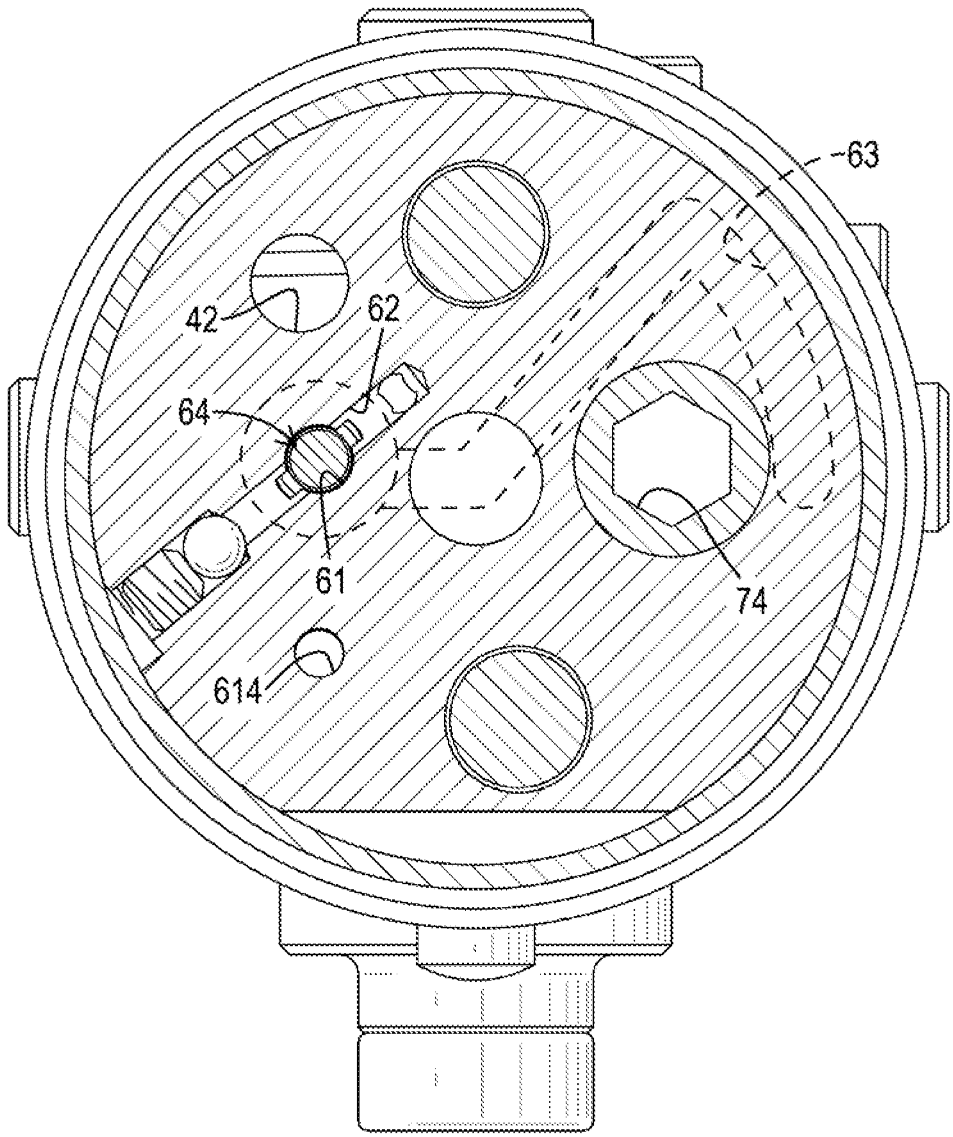
FIGS. 4 and 5 are end views in cross-section of the automatic oil return structure in FIG. 1, showing the main body assembly.
Figure 5:
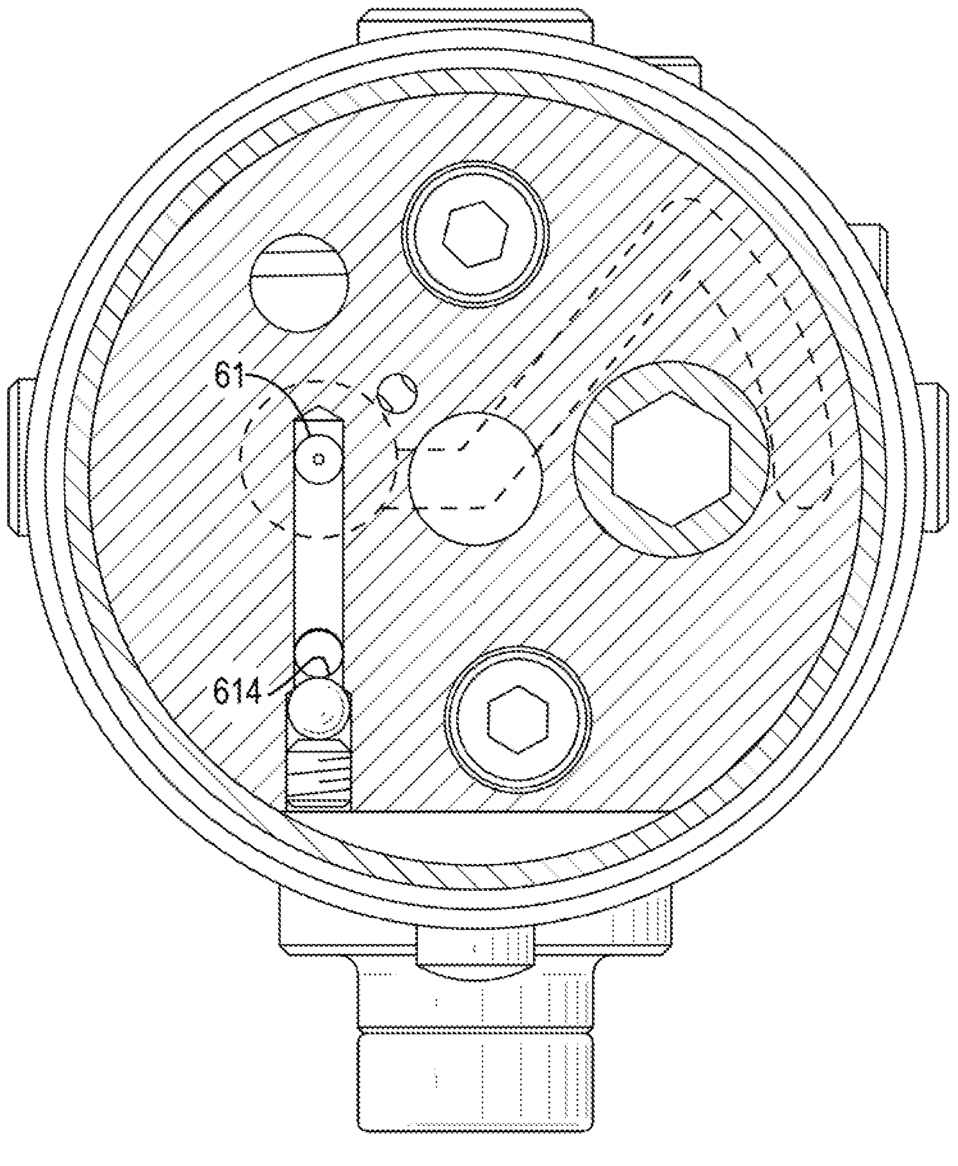
Figure 8:
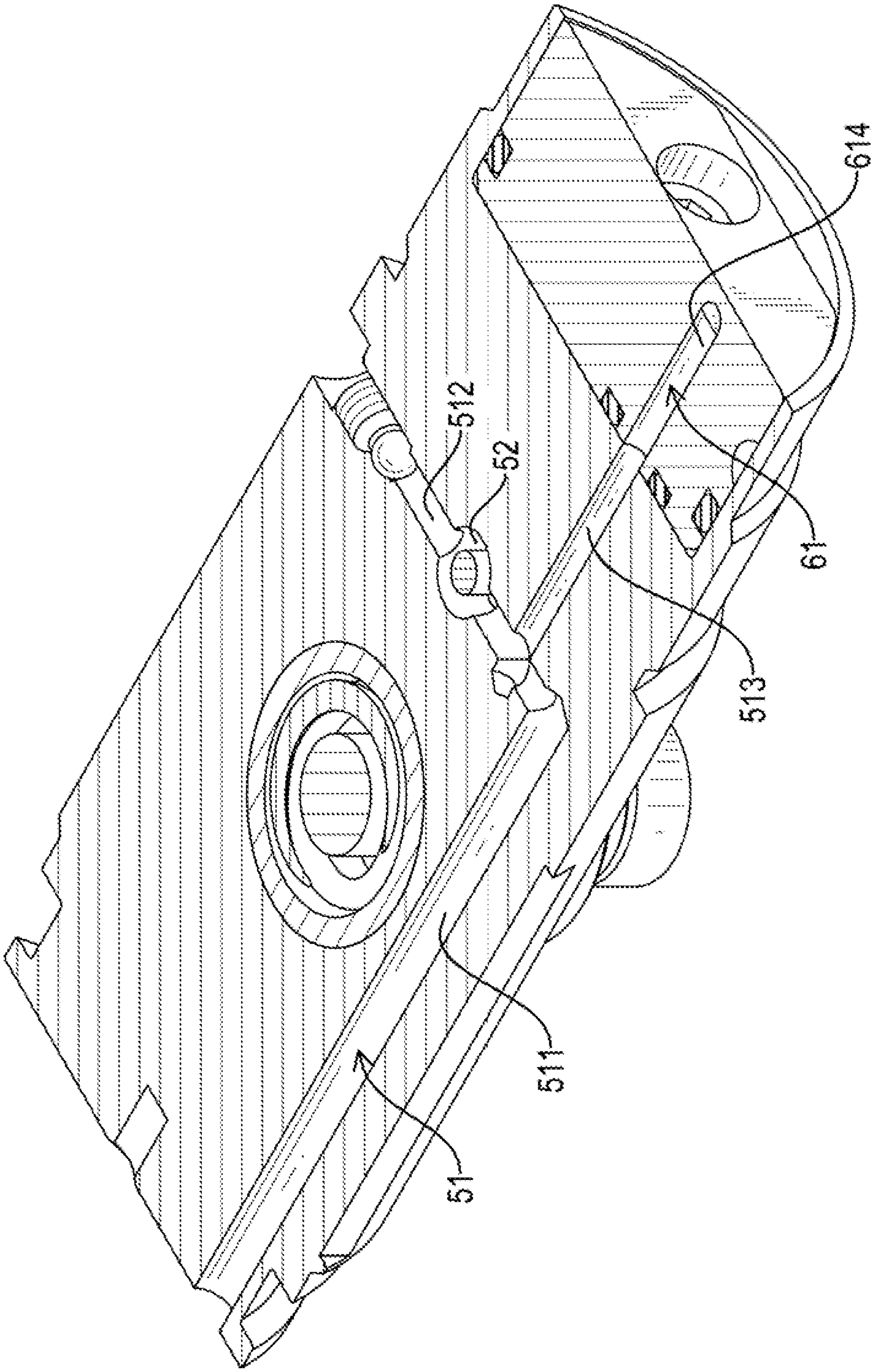
Figure 10:
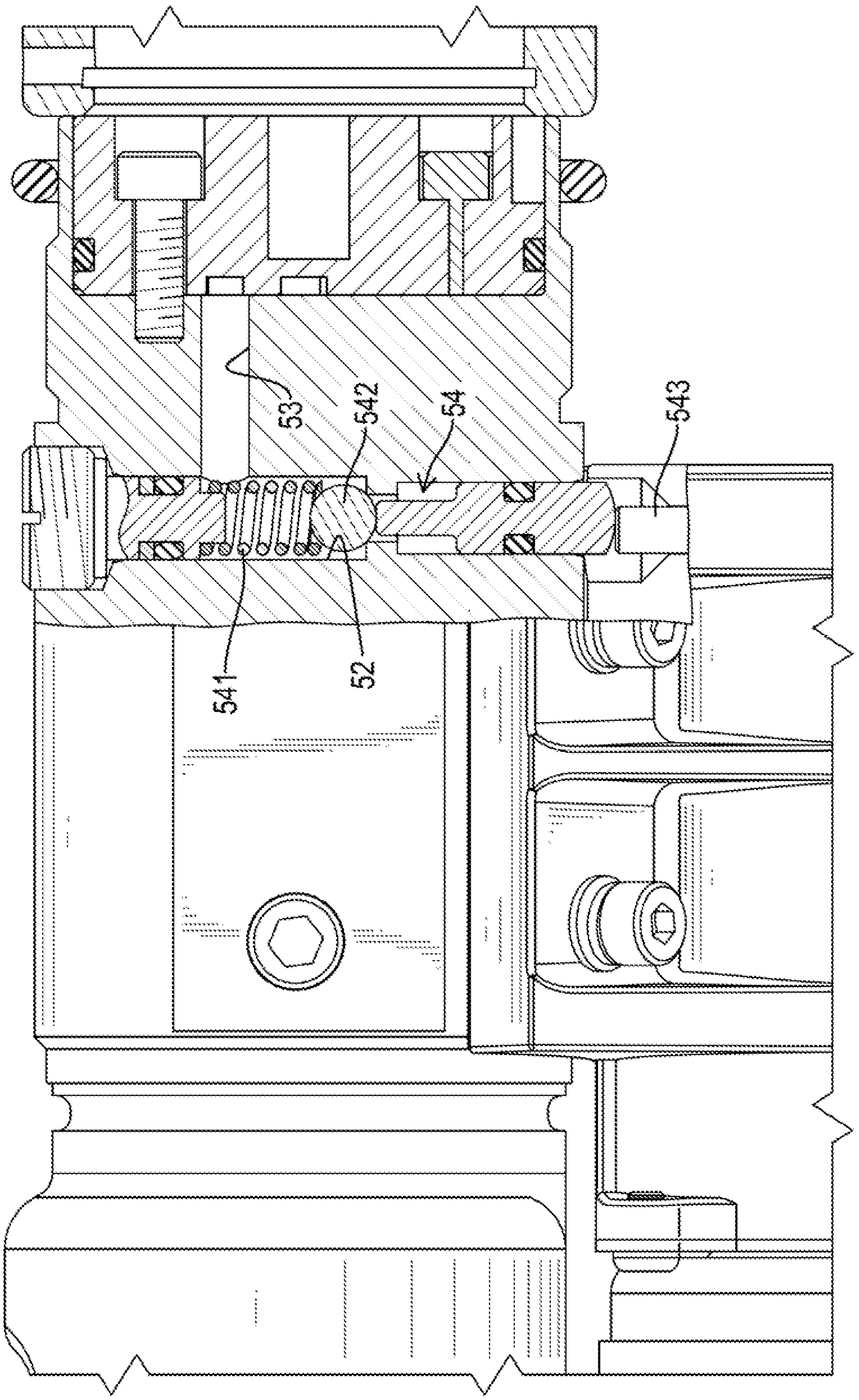

With reference to FIGS. 8, 10 and 11, the automatic oil reflow channel 51 is connected to the oil storage container 10. Preferably, the automatic oil reflow channel 51 has a first front segment 511, a first transverse segment 512, and a first rear segment 513. The first front segment 511 is connected to the oil storage container 10. The first transverse segment 512 is connected to the first front segment 511 and the first rear segment 513. The manual controlling channel 52 is connected to the automatic oil reflow channel 51 (the first transverse segment 512). The manual oil reflow channel 53 is connected to the manual controlling channel 52 and the oil storage chamber 21 of the housing 20. In this embodiment, the manual oil reflow channel 53 is connected to the oil storage chamber 21 via multiple bending passages 531 (as shown in FIG. 3), but not limited thereto as long as the manual oil reflow channel 53 can also be connected to the oil storage chamber 21 via a straight passage.

The manual oil reflow blocking unit 54 is mounted in the manual controlling channel 52 and has a manual elastic unit 541, a manual blocking unit 542, and an oil reflow lever 543. The manual elastic unit 541 pushes the manual blocking unit 542 to block the automatic oil reflow channel 51 and to disconnect the automatic oil reflow channel 51 and the manual controlling channel 52. The oil reflow lever 543 is connected to the manual blocking unit 542. When the oil reflow lever 543 is pushed, the manual blocking unit 542 will be pushed away to connect the automatic oil reflow channel 51 and the manual controlling channel 52 (as shown in FIGS. 2 and 10).

With reference to FIGS. 3 to 5, 8, 11 and 12, the main controlling channel 61 is connected to the automatic oil reflow channel 51 (the first rear segment 513), the piston oil channel 62, and the connecting channel 63. The piston oil channel 62 is connected to the main controlling channel 61 and the oil storage chamber 21 of the housing 20. Preferably, the piston oil channel 62 is in an L shape, is radially connected to the main controlling channel 61, and is axially connected to the oil storage chamber 21, but the configuration of the piston oil channel 62 is not limited the above. The connecting channel 63 is connected to the main controlling channel 61, the first main channel 41, and the first pressure regulating channel 71.

The main controlling unit 64 is mounted in the main controlling channel 61 and controls the piston oil channel 62 to be connected to the automatic oil reflow channel 51 or the connecting channel 63. The controlling unit 64 has a main elastic unit 641 and a main blocking unit 642. The main elastic unit 641 pushes the main blocking unit 642 to block the connecting channel 63 and to connect the piston oil channel 62 and the automatic oil reflow channel 51. When a pressure in the connecting channel 63 is higher than a set value, the main blocking unit 642 will be pushed away and be pushed to block the automatic oil reflow channel 51 and to connect the piston oil channel 62 and the connecting channel 63.

In a preferred embodiment, the main controlling channel 61 has an accommodating space 613, a first opening 611, a second opening 612, and an extending segment 614. The accommodating space 613 is connected to the piston oil channel 62. The first opening 611 and the second opening 612 are respectively located in two ends of the accommodating space 613. The first opening 611 is connected to the connecting channel 63. The second opening 612 is connected to the extending segment 614. The extending segment 614 is connected to the automatic oil reflow channel 51. The extending segment 614 is preferably in an L shape, but it is not limited thereto.

The main blocking unit 642 has a blocking unit main body 6421 and a gasket 6422. The blocking unit main body 6421 and the gasket 6422 are moveably mounted in the accommodating space 613. An outer annular edge of the gasket 6422 is disposed contiguous to an inner wall of the accommodating space 613 and configured for displacement with respect to an axial direction of the accommodating space 613, so that when the gasket 6422 and the blocking unit main body 6421 contact each other, the gasket 6422 and the blocking unit main body 6421 together divide the accommodating space 613 into two unconnected portions. The main elastic unit 641 pushes the gasket 6422 and makes the gasket 6422 push the blocking unit main body 6421 to block the first opening 611, so the connecting channel 63 and the accommodating space 613 are unconnected. When a pressure in the connecting channel 63 increases, the blocking unit main body 6421 and the gasket 6422 are first pushed away from the first opening 611 and are moved toward the second opening 612 together. At this time, the blocking unit main body 6421 and the gasket 6422 are still contiguous to each other, so the connecting channel 63 is still not connected to the automatic oil reflow channel 51 and the piston oil channel 62. Then, the blocking unit main body 6421 and the gasket 6422 continue to be moved together till the blocking unit main body 6421 blocks the second opening 612. At this time, the connecting channel 63, the automatic oil reflow channel 51, and the piston oil channel 62 are not connected to each other. Eventually, as the pressure of the connecting channel 63 continues to increase, the gasket 6422 will continue to be moved toward the second opening 612 and thus is detached from the blocking unit main body 6421, such that a path will be formed between the gasket 6422 and the blocking unit main body 6421 to connect the connecting channel 63 and the piston oil channel 62.

With reference to FIGS. 3, 7, 9, 13 and 17, the first pressure regulating channel 71 is connected to the connecting channel 63. The second pressure regulating channel 73 is connected to the oil storage container 10. The first controlling channel 72 is connected to the first pressure regulating channel 71, the second pressure regulating channel 73, and the second controlling channel 74. In this embodiment, the second controlling channel 74 is connected to the oil storage chamber 21 of the housing 20, but it is not limited thereto.

The pressure regulating controlling unit 75 is mounted in the first controlling channel 72 and controls the connection between the first pressure regulating channel 71 and the second pressure regulating channel 73. The pressure regulating controlling unit 75 has a pressure regulating elastic unit 751 and a pressure regulating blocking unit 752. The pressure regulating elastic unit 751 pushes the pressure regulating blocking unit 752 to block the first pressure regulating channel 71, so as to disconnect the first pressure regulating channel 71 and the first controlling channel 72. But when a pressure in the first pressure regulating channel 71 is higher than a set value, the pressure regulating blocking unit 752 will be pushed away to connect the first pressure regulating channel 71 and the first controlling channel 72.

Figure 13:
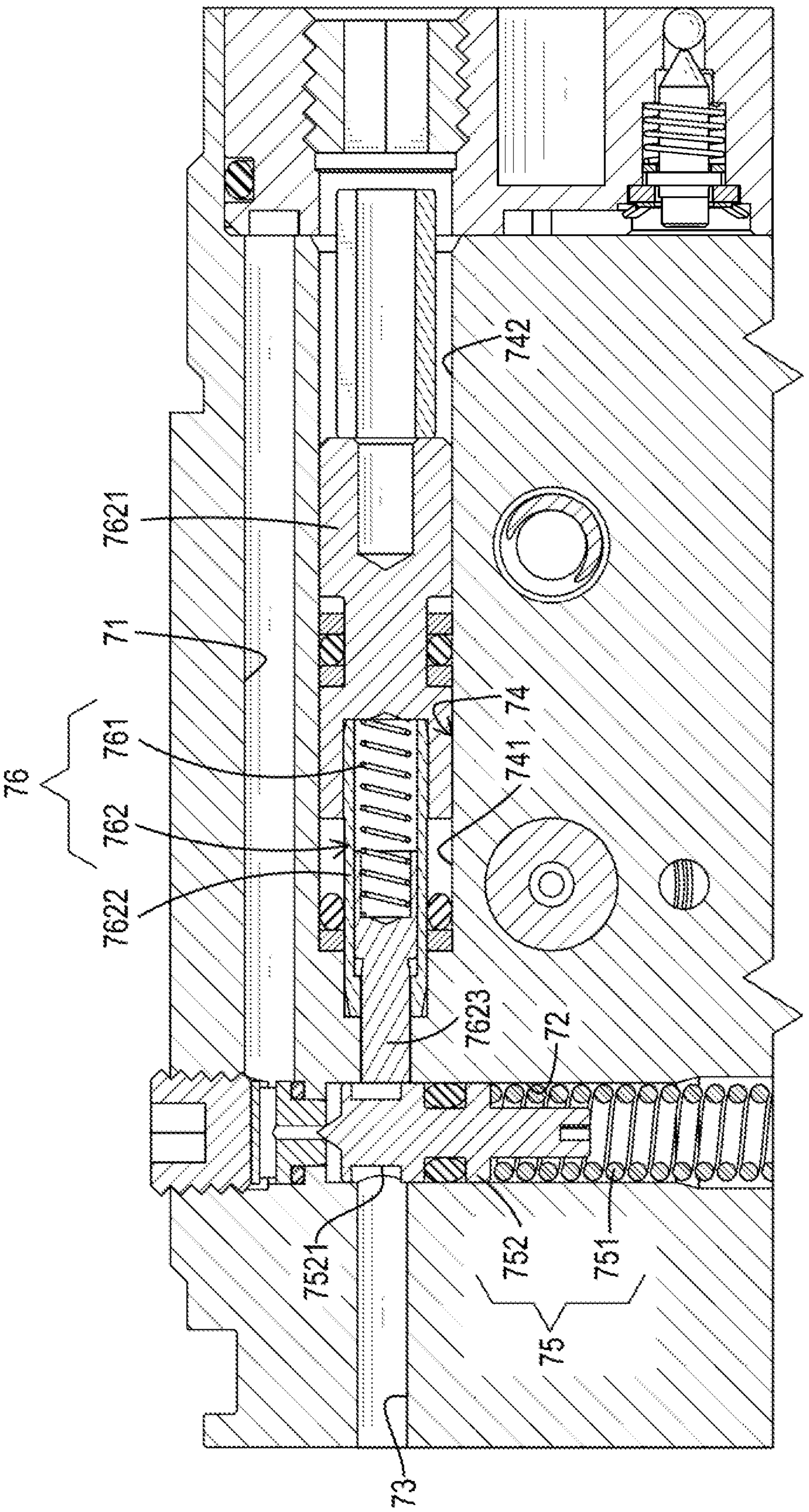
FIGS. 13 to 16 are operational side views in cross-section of the automatic oil return structure in FIG. 1, showing the main body assembly.
Figure 17:
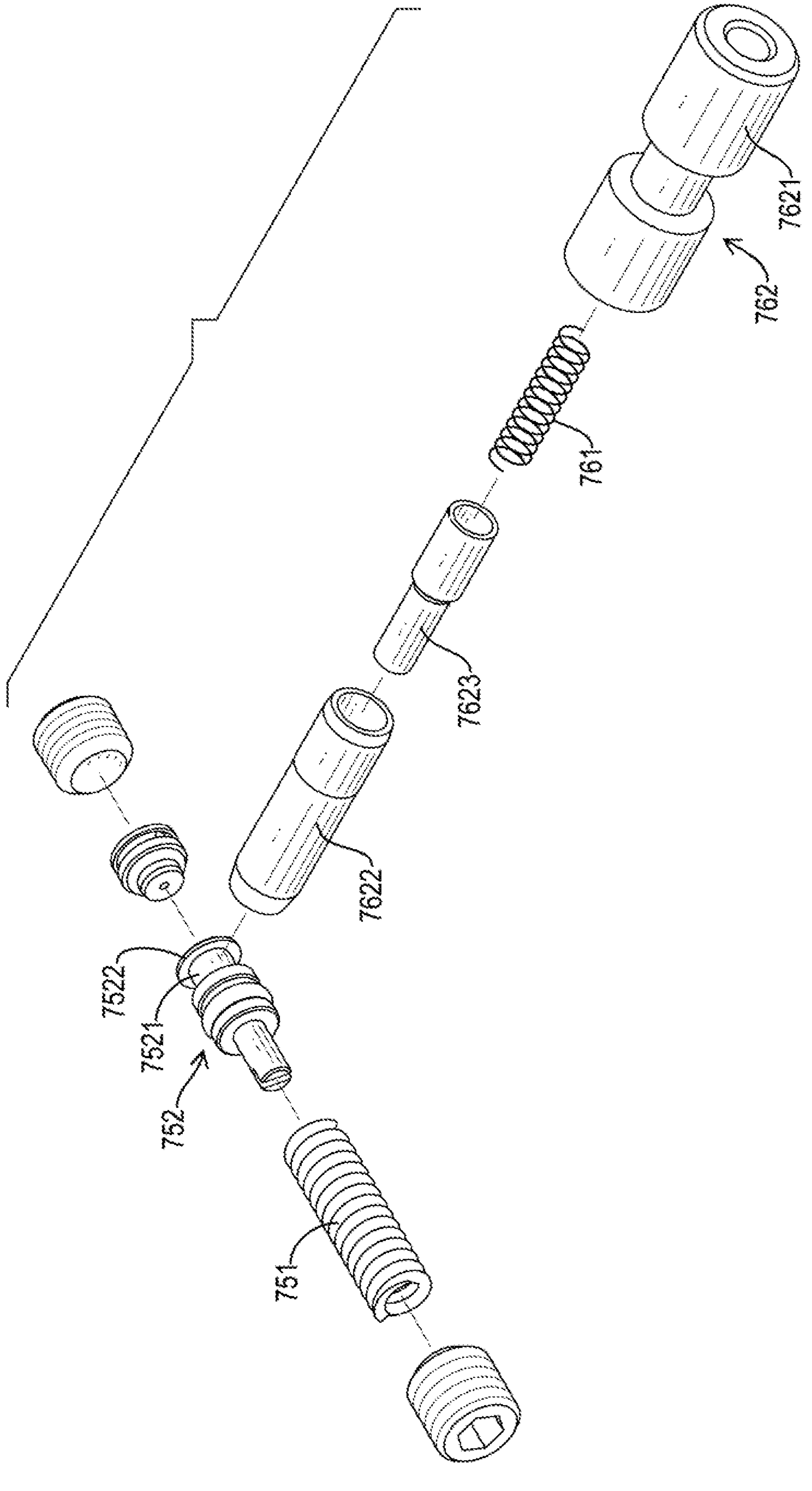
FIG. 17 is still another exploded view of the automatic oil return structure in FIG. 1, showing the pressure regulating controlling unit and the engagement controlling unit.
Figure 18:
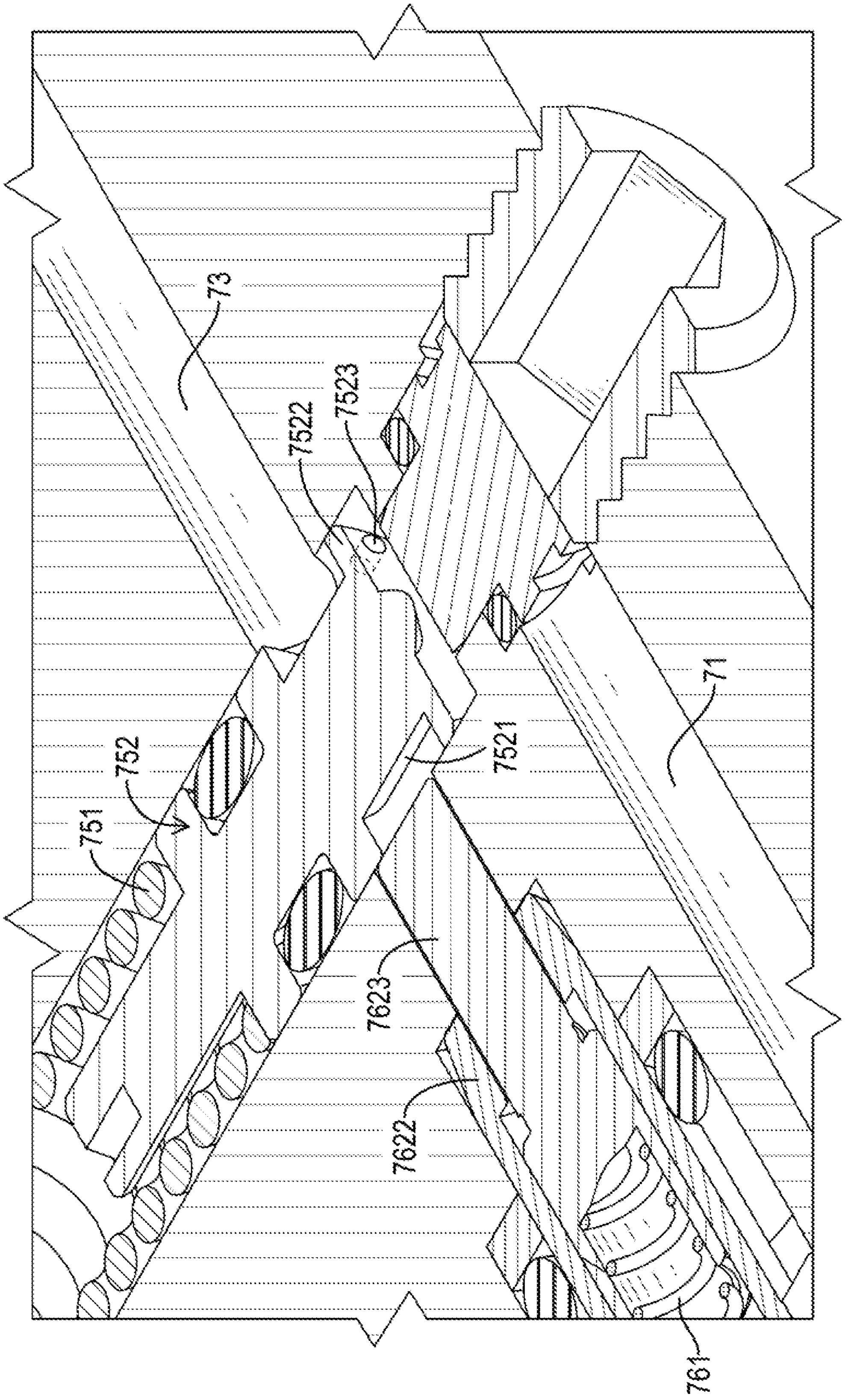
FIG. 18 is another top view in cross-section of the automatic oil return structure in FIG. 1, showing the pressure regulating controlling unit and the engagement controlling unit.

With reference to FIGS. 13, 17 and 18, the pressure regulating blocking unit 752 forms an engaging groove 7521 radially inward. The engaging groove 7521 is preferably, but not limited to, an annular groove extending and surrounding along an outer wall of the pressure regulating blocking unit 752. Besides, preferably, an end of the pressure regulating blocking unit 752 has an outer annular wall 7522. The outer annular wall 7522 is disposed contiguous to an inner wall of the first controlling channel 72 and configured for displacement with respect to an axial direction of the first controlling channel 72, so as to divide the first controlling channel 72 into two isolated portions, but the outer annular wall 7522 forms an oil reflow hole 7523 therethrough (as shown in FIG. 18), so that the oil can only flow through the oil reflow hole 7523.

Figure 14:
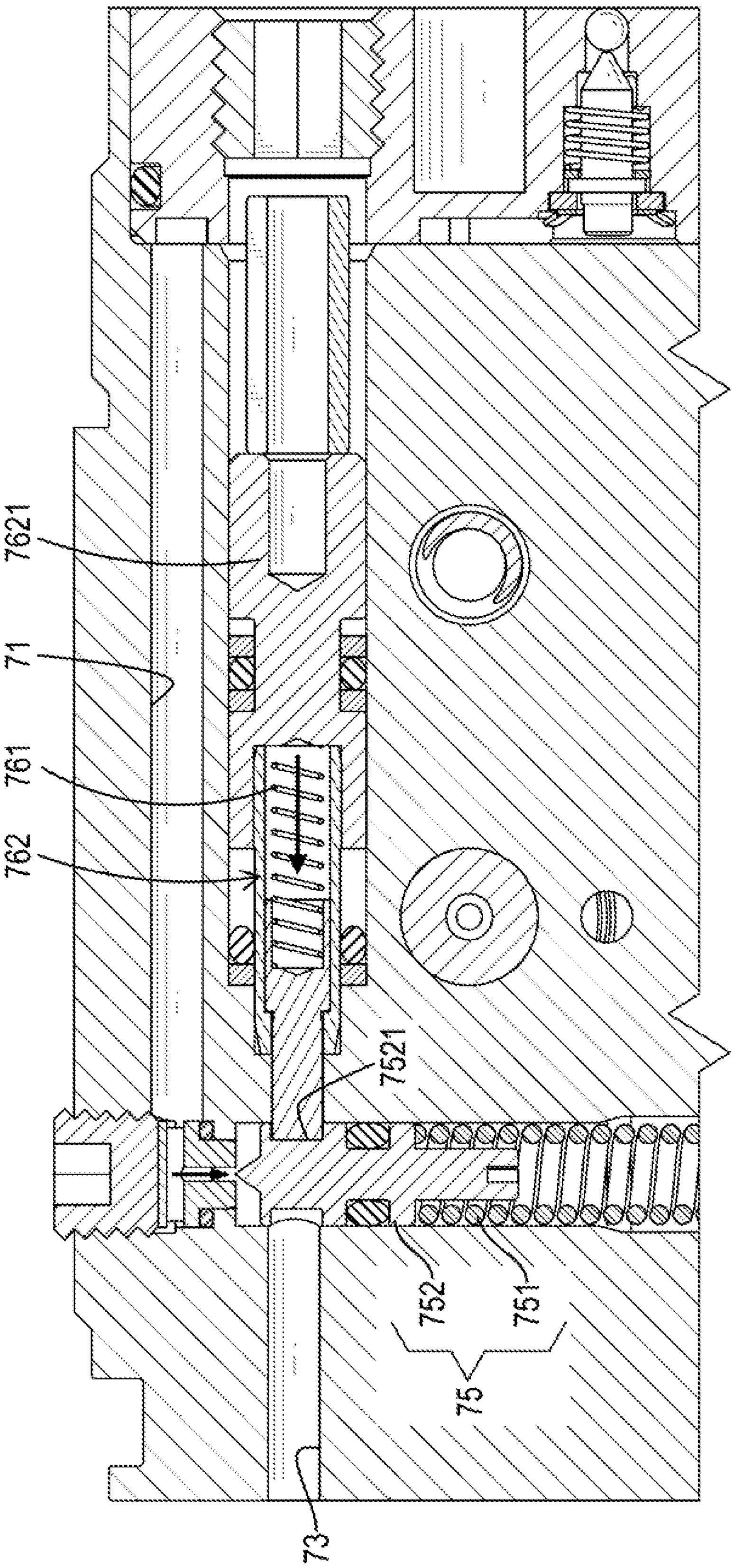

The engagement controlling unit 76 is mounted in the second controlling channel 74 and has an engaging elastic unit 761 and an engaging unit 762. The engaging elastic unit 761 pushes the pressure regulating blocking unit 752 toward the pressure regulating blocking unit 752. With reference to FIG. 14, when a pressure in the first pressure regulating channel 71 is higher than a set value such that the pressure regulating blocking unit 752 is pushed away to a set distance, the engaging unit 762 that originally abuts an outer wall of the pressure regulating blocking unit 752 will be aligned to the engaging groove 7521 and be pushed to engage in the engaging groove 7521 (as shown in FIG. 14) such that the pressure regulating blocking unit 752 is unmovable to avoid blocking the first pressure regulating channel 71, and preferably, to make the pressure regulating blocking unit 752 unmoveable.

Figure 15:
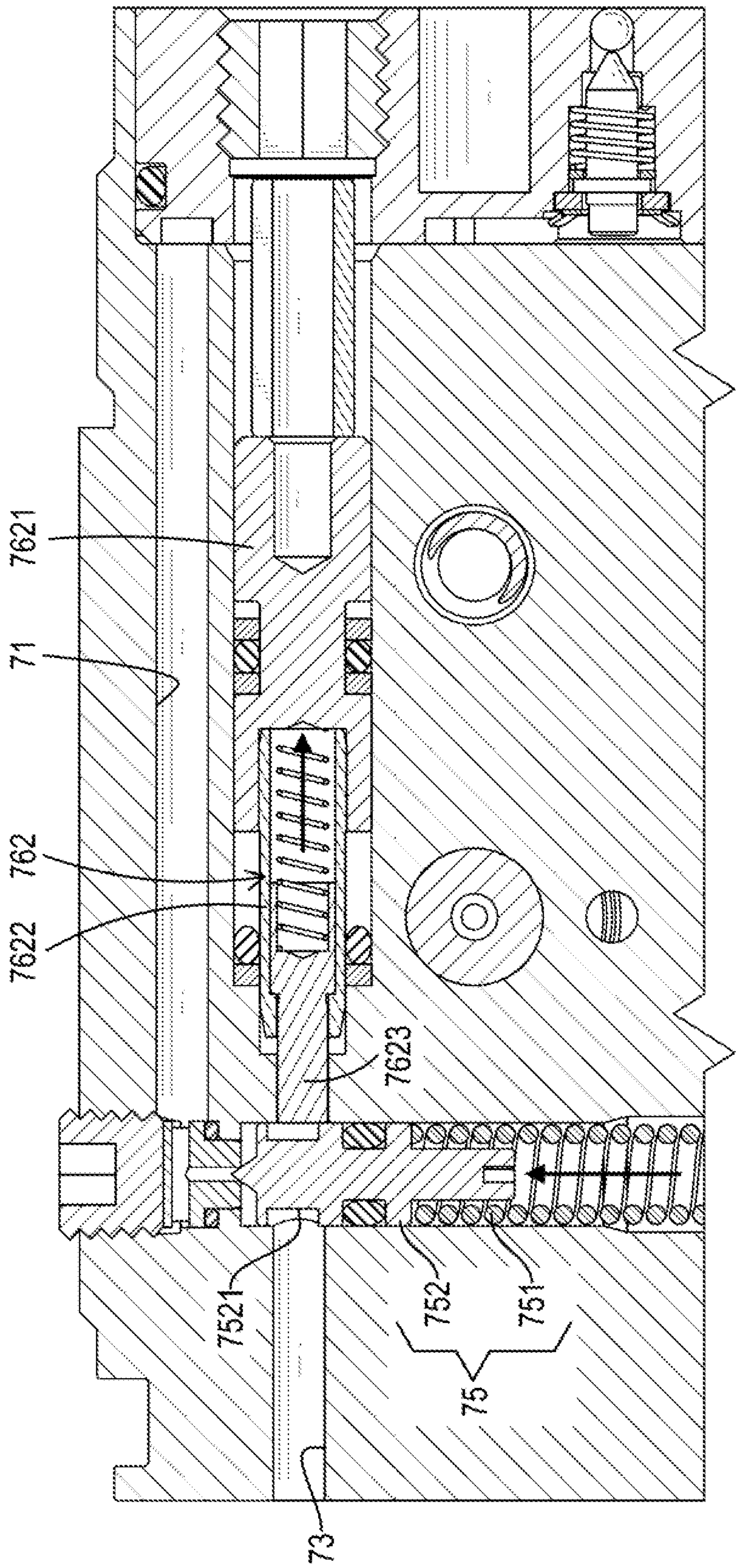

Besides, the engaging unit 762 divides the second controlling channel 74 into a disengaging segment 741 and a resetting segment 742 which are unconnected to each other. The disengaging segment 741 is connected to the first controlling channel 72. The resetting segment 742 is connected to the oil storage chamber 21 of the housing 20. Preferably, the engaging unit 762 has a dividing unit 7621, a pull-back cylinder 7622, and an engaging main body 7623. The dividing unit 7621 divides the second controlling channel 74 into the disengaging segment 741 and the resetting segment 742. The pull-back cylinder 7622 is located between the pressure regulating blocking unit 752 and the dividing unit 7621. An end of the pull-back cylinder 7622 is securely mounted on the dividing unit 7621, and the pull-back cylinder 7622 is preferably screwed with the dividing unit 7621. The engaging main body 7623 is moveably located in the pull-back cylinder 7622. An end of the engaging main body 7623 protrudes out of the pull-back cylinder 7622 toward the pressure regulating blocking unit 752. When the pull-back cylinder 7622 is moved away from the pressure regulating blocking unit 752, the pull-back cylinder 7622 moves the engaging main body 7623 away from the pressure regulating blocking unit 752 (as shown in FIG. 15). The engaging elastic unit 761 is located in the pull-back cylinder 7622 and pushes the engaging main body 7623 toward the pressure regulating blocking unit 752.

The disengaging channel 77 is connected to the disengaging segment 741 of the second controlling channel 74 and the first main channel 41.

Figure 12:
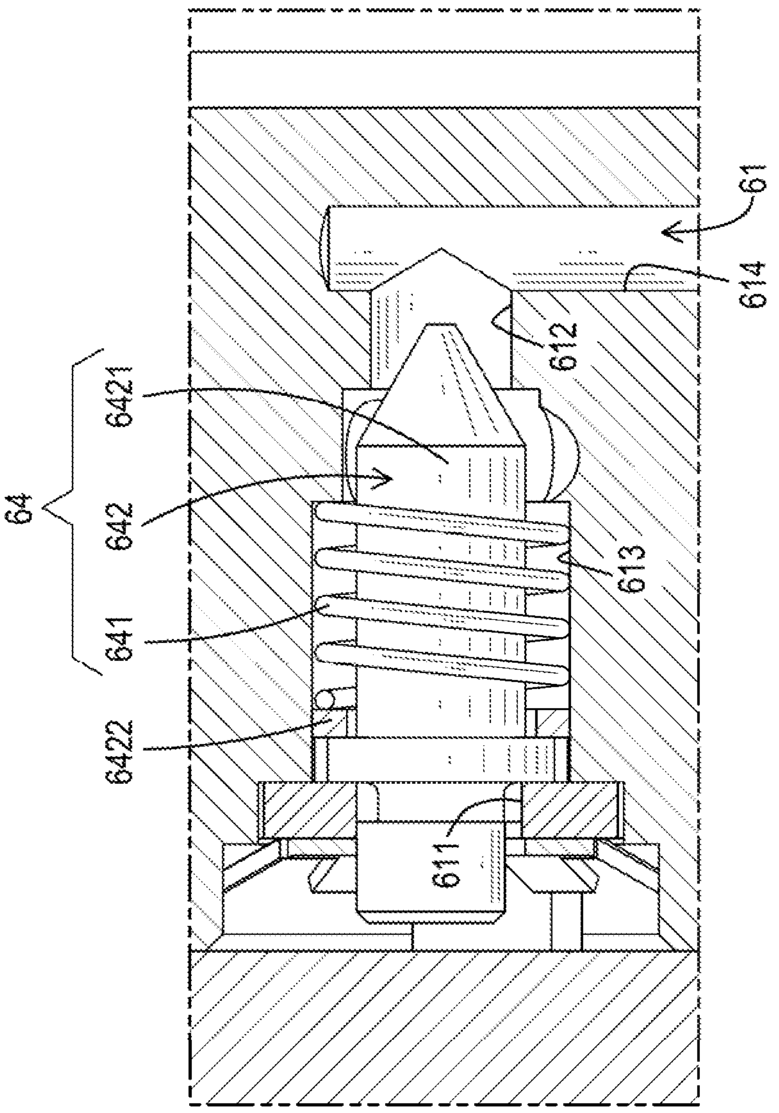
FIG. 12 is a partial enlarged view of FIG. 11.

With reference to FIGS. 3, 6 and 12, when the piston pump is operated normally, oil in the oil storage container 10 flows into the housing 20 through the second main channel 42, and at the same time the oil also flows into the housing 20 sequentially through the first main channel 41, the connecting channel 63, the main controlling channel 61 (pushing away the main blocking unit 642), and the piston oil channel 62, so as to push the housing 20 to move.

Besides, with reference to FIGS. 3, 6, 7 and 13, at the same time, the oil in the housing 20 also flows into the first pressure regulating channel 71 sequentially through the piston oil channel 62, the main controlling channel 61, and the connecting channel 63. But the oil in the housing 20 will not move from the first pressure regulating channel 71 to the first controlling channel 72 because the pressure of the oil in the housing 20 at an early stage is inadequate to push away and open the pressure regulating blocking unit 752 in the first pressure regulating channel 71.

However, with reference to FIGS. 3, 6, 7 and 14, when the pressure of the oil in the housing 20 increases, the pressure will be transmitted to the first pressure regulating channel 71 to push away the pressure regulating blocking unit 752, and the engaging unit 762 that originally abuts the outer wall of the pressure regulating blocking unit 752 will be pushed and engaged into the engaging groove 7521 of the pressure regulating blocking unit 752, thereby keeping the pressure regulating blocking unit 752 in the pushed-away position. When the pressure regulating blocking unit 752 remains pushed away, the first pressure regulating channel 71 is connected to the oil storage container 10 through the second pressure regulating channel 73, such that the pressure of the oil is released and the oil cannot continue to push the main blocking unit 642 inside the main controlling channel 61, so the main blocking unit 642 is changed to block the connecting channel 63 and the piston oil channel 62 is changed to be connected to the automatic oil reflow channel 51, and thus the oil in the housing 20 can be returned to the oil storage container 10 through the piston oil channel 62, the main controlling channel 61, and the automatic oil reflow channel 51.

With reference to FIGS. 9 and 15, when the piston pump is reused next time, during the movement that the oil in the oil storage container 10 passes through the first main channel 41 to the housing 20, the oil in the oil storage container 10 will also pass through the disengaging channel 77 to the disengaging segment 741 of the second controlling channel 74 and push the engaging unit 762 away from the pressure regulating blocking unit 752. Specifically, the oil pushes and moves the dividing unit 7621, and the dividing unit 7621 pulls the engaging main body 7623 away from the pressure regulating blocking unit 752 via the pull-back cylinder 7622. Therefore, the pressure regulating blocking unit 752 will be pushed by the pressure regulating elastic unit 751 to immediately reset to block the first pressure regulating channel 71, and the oil in the oil storage container 10 will push away the main blocking unit 642 again to change the main blocking unit 642 to block the automatic oil reflow channel 51 after reaching the main controlling channel 61 sequentially through the first main channel 41 and the connecting channel 63, so that the automatic oil reflow channel 51 is blocked, thereby avoiding oil reflow.

By this, the present invention actuates the automatic oil reflow function when the pressure in the housing 20 reaches a set value, automatically returns the oil until all of the oil in the housing 20 is returned to the oil storage container 10, and returns to a non-oil-reflow state before being used next time, thereby facilitating operation.

Figure 16:
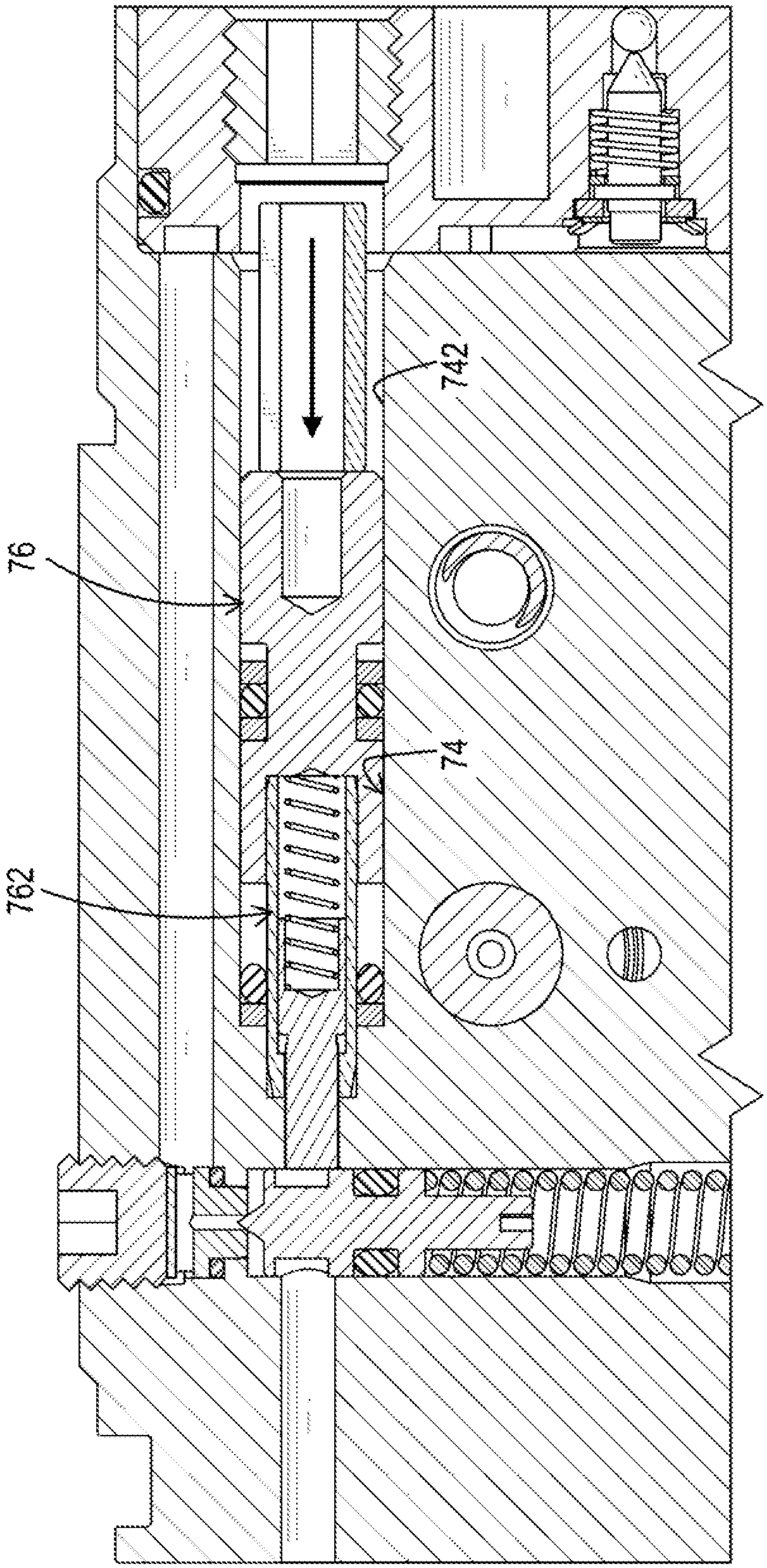

Besides, with reference to FIG. 16, when the piston pump is reused next time, as the increasing oil and pressure in the housing 20, the oil in the housing 20 will also flow into the second controlling channel 74 through the resetting segment 742 to push back the engaging unit 762. Additionally, in other embodiments, the resetting segment 742 of the second controlling channel 74 can also be unconnected to the housing 20 but pushed back by configuring an elastic unit instead.

Furthermore, if necessary, the oil can be returned manually by a user pushing the oil reflow lever 543. When the oil reflow lever 543 is pressed, the manual blocking unit 542 will be pushed away and thus the automatic oil reflow channel 51 is connected to the manual controlling channel 52 (as shown in FIGS. 2 and 10), so that the oil in the housing 20 can flow back to the oil storage container 10 through the manual oil reflow channel 53, the manual controlling channel 52, and the automatic oil reflow channel 51. Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An automatic oil return structure comprising:

an oil storage container;

a housing spaced apart from the oil storage container and having an oil storage chamber;

a main body assembly mounted between the oil storage container and the housing and having a first main channel connected to the oil storage container;

a second main channel connected to the oil storage container and the oil storage chamber of the housing;

a first main channel blocking unit mounted in the first main channel and selectively blocking the first main channel;

a second main channel blocking unit mounted in the second main channel and selectively blocking the second main channel;

an automatic oil reflow channel connected to the oil storage container;

a piston oil channel connected to the oil storage chamber of the housing;

a connecting channel connected to the first main channel;

a main controlling channel connected to the automatic oil reflow channel, the connecting channel and the piston oil channel;

a main controlling unit mounted in the main controlling channel and having a main blocking unit; and a main elastic unit configured to push the main blocking unit to block the connecting channel and to connect the piston oil channel and the automatic oil reflow channel; wherein when a pressure in the connecting channel is higher than a set value, the main blocking unit is pushed away and pushed to block the automatic oil reflow channel and to connect the piston oil channel and the connecting channel;

a first pressure regulating channel connected to the connecting channel;

a first controlling channel connected to the first pressure regulating channel;

a second pressure regulating channel connected to the first controlling channel and the oil storage container;

a second controlling channel connected to the first controlling channel;

a pressure regulating controlling unit mounted in the first controlling channel and having a pressure regulating blocking unit; and a pressure regulating elastic unit pushing the pressure regulating blocking unit to block the first pressure regulating channel; wherein when a pressure in the first pressure regulating channel is higher than a set value, the pressure regulating blocking unit is pushed away to connect the first pressure regulating channel and the first controlling channel;

an engaging groove formed radially inward on the pressure regulating blocking unit;

an engagement controlling unit mounted in the second controlling channel and having an engaging unit dividing the second controlling channel into a disengaging segment and a resetting segment which are unconnected with each other; the disengaging segment connected to the first controlling channel; and an engaging elastic unit configured to push the engaging unit toward the pressure regulating blocking unit; wherein when the pressure in the first pressure regulating channel is higher than the set value and the pressure regulating blocking unit is pushed away to a set distance, the engaging unit is pushed to engage with the engaging groove of the pressure regulating blocking unit such that the pressure regulating blocking unit is unmovable to avoid blocking the first pressure regulating channel; and a disengaging channel connected to the disengaging segment of the second controlling channel and the first main channel.

2. The automatic oil return structure as claimed in claim 1, wherein the engaging unit of the engagement controlling unit has a dividing unit, a pull-back cylinder, and an engaging main body; the dividing unit divides the second controlling channel into the disengaging segment and the resetting segment; the pull-back cylinder is located between the pressure regulating blocking unit and the dividing unit; an end of the pull-back cylinder is securely mounted on the dividing unit; the engaging main body is moveably mounted in the pull-back cylinder; an end of the engaging main body protrudes out of the pull-back cylinder toward the pressure regulating blocking unit; the engaging elastic unit is located in the pull-back cylinder and is configured to push the engaging main body toward the pressure regulating blocking unit.

3. The automatic oil return structure as claimed in claim 2, wherein the engaging groove of the pressure regulating blocking unit is an annular groove surrounding and extending along an outer annular wall of the pressure regulating blocking unit.

4. The automatic oil return structure as claimed in claim 3, wherein an end of the pressure regulating blocking unit has an outer annular wall; the outer annular wall is disposed contiguous to an inner wall of the first controlling channel and configured for displacement with respect to an axial direction of the first controlling channel; the outer annular wall forms an oil reflow hole thereon.

5. The automatic oil return structure as claimed in claim 4, wherein the main controlling channel has an accommodating space, a first opening, a second opening, and an extending segment; the accommodating space is connected to the piston oil channel; the first opening and the second opening are respectively located on two ends of the accommodating space; the first opening is connected to the connecting channel; the second opening is connected to the extending segment; the extending segment is connected to the automatic oil reflow channel; and the main blocking unit has a blocking unit main body and a gasket; the blocking unit main body and the gasket are moveably mounted in the accommodating space; an outer annular edge of the gasket is disposed contiguous to an inner wall of the accommodating space and configured for displacement with respect to an axial direction of the accommodating space; the main elastic unit pushes the gasket and makes the gasket push the blocking unit main body to block the first opening; when the pressure in the connecting channel increases, the blocking unit main body and the gasket are first pushed away from the first opening and are moved toward the second opening together till the blocking unit main body blocks the second opening, and then the gasket continues to move towards the second opening and detaches from the blocking unit main body as the pressure in the connecting channel continues to increase, forming a path that connects the connecting channel and the piston oil channel between the gasket and the blocking unit main body.

6. The automatic oil return structure as claimed in claim 5, wherein the main body assembly has a manual controlling channel connected to the automatic oil reflow channel;

a manual oil reflow blocking unit mounted in the manual controlling channel and having a manual elastic unit, a manual blocking unit, and an oil reflow lever; the manual elastic unit configured to push the manual blocking unit to block the automatic oil reflow channel; the oil reflow lever connected to the manual blocking unit; wherein when the oil reflow lever is pushed, the manual blocking unit is pushed away to connect the automatic oil reflow channel and the manual controlling channel;

a manual oil reflow channel connected to the manual controlling channel and the oil storage chamber of the housing.

7. The automatic oil return structure as claimed in claim 6, wherein the automatic oil reflow channel has a first front segment, a first transverse segment, and a first rear segment; the first front segment is connected to the oil storage container; the first rear segment is connected to the main controlling channel; the first transverse segment is connected to the first front segment, the first rear segment, and the manual controlling channel.

8. The automatic oil return structure as claimed in claim 7, wherein the resetting segment of the second controlling channel is connected to the oil storage chamber of the housing.

9. The automatic oil return structure as claimed in claim 1, wherein the engaging groove of the pressure regulating blocking unit is an annular groove surrounding and extending along an outer annular wall of the pressure regulating blocking unit.

10. The automatic oil return structure as claimed in claim 1, wherein an end of the pressure regulating blocking unit has an outer annular wall; the outer annular wall is disposed contiguous to an inner wall of the first controlling channel and configured for displacement with respect to an axial direction of the first controlling channel; the outer annular wall forms an oil reflow hole thereon.

11. The automatic oil return structure as claimed in claim 1, wherein the main controlling channel has an accommodating space, a first opening, a second opening, and an extending segment; the accommodating space is connected to the piston oil channel; the first opening and the second opening are respectively located on two ends of the accommodating space; the first opening is connected to the connecting channel; the second opening is connected to the extending segment; the extending segment is connected to the automatic oil reflow channel; and the main blocking unit has a blocking unit main body and a gasket; the blocking unit main body and the gasket are moveably mounted in the accommodating space; an outer annular edge of the gasket is disposed contiguous to an inner wall of the accommodating space and configured for displacement with respect to an axial direction of the accommodating space; the main elastic unit pushes the gasket and makes the gasket push the blocking unit main body to block the first opening; when the pressure in the connecting channel increases, the blocking unit main body and the gasket are first pushed away from the first opening and are moved toward the second opening together till the blocking unit main body blocks the second opening, and then the gasket continues to move towards the second opening and detaches from the blocking unit main body as the pressure in the connecting channel continues to increase, forming a path that connects the connecting channel and the piston oil channel between the gasket and the blocking unit main body.

12. The automatic oil return structure as claimed in claim 1, wherein the main body assembly has a manual controlling channel connected to the automatic oil reflow channel;

a manual oil reflow blocking unit mounted in the manual controlling channel and having a manual elastic unit, a manual blocking unit, and an oil reflow lever; the manual elastic unit configured to push the manual blocking unit to block the automatic oil reflow channel; the oil reflow lever connected to the manual blocking unit; wherein when the oil reflow lever is pushed, the manual blocking unit is pushed away to connect the automatic oil reflow channel and the manual controlling channel;

a manual oil reflow channel connected to the manual controlling channel and the oil storage chamber of the housing.

13. The automatic oil return structure as claimed in claim 12, wherein the automatic oil reflow channel has a first front segment, a first transverse segment, and a first rear segment; the first front segment is connected to the oil storage container; the first rear segment is connected to the main controlling channel; the first transverse segment is connected to the first front segment, the first rear segment, and the manual controlling channel.

14. The automatic oil return structure as claimed in claim 1, wherein the resetting segment of the second controlling channel is connected to the oil storage chamber of the housing.

* * * * *